(12) United States Patent
Strong

(10) Patent No.: US 6,442,191 B1
(45) Date of Patent: Aug. 27, 2002

(54) TECHNIQUE TO EXTEND THE JAMMING MARGIN OF A DSSS COMMUNICATION SYSTEM

(75) Inventor: Peter Nelson Strong, New Malden (GB)

(73) Assignee: Advanced Technology Ramar Ltd., Christchurch Dorset (GB)

( * ) Notice: Subject to any disclaimer, the term of this patent is extended or adjusted under 35 U.S.C. 154(b) by 0 days.

(21) Appl. No.: 09/369,511

(22) Filed: Aug. 6, 1999

(30) Foreign Application Priority Data

Aug. 13, 1998 (GB) ............................................. 9817684

(51) Int. Cl.⁷ .......................... H04B 15/00; H04K 1/00; H04L 27/30
(52) U.S. Cl. ........................................ 375/146; 375/141
(58) Field of Search ................................ 375/146, 140, 375/141, 144

(56) References Cited

U.S. PATENT DOCUMENTS

| | | | |
|---|---|---|---|
| 4,864,589 A | * 9/1989 | Endo | 375/200 |
| 5,546,424 A | * 8/1996 | Miyake | 375/206 |
| 5,604,767 A | * 2/1997 | Dixon et al. | 375/206 |
| 6,094,450 A | * 7/2000 | Shockey | 375/141 |

FOREIGN PATENT DOCUMENTS

| | | |
|---|---|---|
| EP | 0 385 636 | 9/1990 |
| GB | 1 566 442 | 4/1980 |
| GB | 2 308 949 | 7/1997 |
| WO | WO95/12924 | 5/1995 |

OTHER PUBLICATIONS

Jack K. Holmes, Coherent Spread Spectrum System, published by Wiley Intersciences, Chapters 8–10.
Robert C. Dixon, Spread Spectrum Systems $2^{nd}$ Edition, published by Wiley Intersciences, pp. 254–259.

* cited by examiner

*Primary Examiner*—Chi Pham
*Assistant Examiner*—Phuong Phu
(74) *Attorney, Agent, or Firm*—Collard & Roe, P.C.

(57) ABSTRACT

A device to extend the jamming margin of a low data rate DSSS communication system uses a transmitter which has two spreading sequences, a primary and a secondary sequence. The receiver uses a single correlator non-coherent detector with a tau-dither tracking loop. The receiver acquires and tracks the primary sequence. The secondary sequence has a chip rate lower than the repetition rate of the primary sequence, and passes through a post-despreading filter of the receiver. The post detector filter is deliberately widened compared to the normal bandwidth required to filter the data. The addition of the secondary spreading sequence and widening of the post detector bandwidth improves the jamming margin of the system.

5 Claims, 2 Drawing Sheets

TECHNIQUE TO EXTEND THE JAMMING MARGIN OF A DSSS COMMUNICATION SYSTEM

BACKGROUND OF THE INVENTION

1. Field of the Invention

The present invention relates to a communication system used to transfer data packets at a relatively low data rate. The jamming margin is a measure of the tolerance of a spread spectrum system to in-band interference.

The FCC regulations part 15 which governs the US Industrial, Scientific and Medical (ISM) band (902–928 MHz) requires the use of frequency hopping or direct sequence spread spectrum (DSSS) modulations schemes.

2. The Prior Art

Spread spectrum technology has been used in the field of radio communications to eliminate the effects of interference and to prevent eavesdropping. For a fuller description of spread spectrum technology and its implementation in communications systems; reference may be made to Spread Spectrum Systems, 2nd Edition by Robert C. Dixon, published by Wiley Intersciences (ISBN 0-471-88309-3) or Coherent Spread Spectrum Systems by Jack K. Holmes also published by Wiley Intersciences (ISBN 0-47103301-4).

SUMMARY OF THE INVENTION

The technique is adapted for use in an Automatic Meter Reading (AMR) systems in which meters to be read each have a transponder containing a receiver and transmitter. The receiver is capable of recognizing a wake up signal and the transponder is then enabled to transmit data which includes data on the meter reading and the identity of the meter. The technique of the invention is used for communications between a transponder and a transmitter of a system concentrator, but is not restricted to this application. In any AMR system a very large number of transponders will be required. The design of the transponders must be reliable and economical to produce.

AMR systems typically use the unlicensed 902–928 MHz ISM band and are required to comply with FCC regulations part 15. This band is intended for use by many users and any system designed to use this band should tolerate interference from other users of the band.

One measure of the tolerance of a system to in-band interference is the jamming margin. The jamming margin may be measured by subjecting the communication system to sine wave interference. The power of the interference is decreased to the point at which acceptable performance of the communication link is obtained. Typically, for an AMR system, this would be the level at which fewer than 10% of packets are lost. The ratio of the power of the interference to that of the desired signal from the transmitter is the jamming margin, also called Jammer to Signal ratio (J/S). Each result applies for interference at the specific frequency used for the measurement.

A composite jamming margin for the system is based on all the J/S measurements obtained as the frequency of the interference is stepped through the pass band of the system. The FCC regulations part 15.247(e) allow discarding of the worst 20% of J/S measurements and using the lowest remaining J/S measurement. Typically a system is designed to maximize the minimum J/S measurement.

To reduce the cost of the system, low tolerance oscillators may be used in the transmitter and receiver. Typically there will be a relatively large frequency offset between these oscillators and the receiver must be able to tolerate this offset and still reliably demodulate the transmitted data.

The transponder receiver must be capable of locking on to the transmitted spread spectrum signal quickly. This is required so that a large number of meters can be read in a short space of time. In DSSS schemes there is normally a two step process involving:

Search step during which the transponder receiver acquires and locks onto the transmitted signal;

Tracking step during which the transponder receiver remains locked onto the signal and demodulates the received signal.

To solve the technical necessity for maximum system jamming margin, rapid acquisition, tolerance to frequency offset and economical production costs, the transmitter and receiver defined in the claims are employed.

A transmitter for extending the jamming margin of a DSSS communications system suitable for use in an AMR system, in accordance with the invention comprises: a primary PN generator for producing a primary PN chip sequence; a secondary PN generator with a clock rate less than half the repeat rate of the primary PN generator; a logic gate to combine the outputs from the primary and secondary PN generators into an output signal; a Binary Phase Shift Keying (BPSK) modulator for receiving said output signal; a data input for a digital signal representing information to be transmitted; a Manchester encoder for receiving the data signal, the data rate being substantially less than the clock rate of the secondary PN generator and producing a data output; and means for modulating the primary PN sequence with the data output.

Preferably when such a system is used in an AMR application the system transmitter used is essentially a BPSK modulated spread spectrum transmitter. The transponder receiver used is essentially a single correlator non-coherent spread spectrum receiver using a tau-dither tracking loop.

A further advantage of the use of the secondary spreading provided by the secondary PN generator is to reduce the peak spectral density which makes it easier to meet the FCC part 2 regulations.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
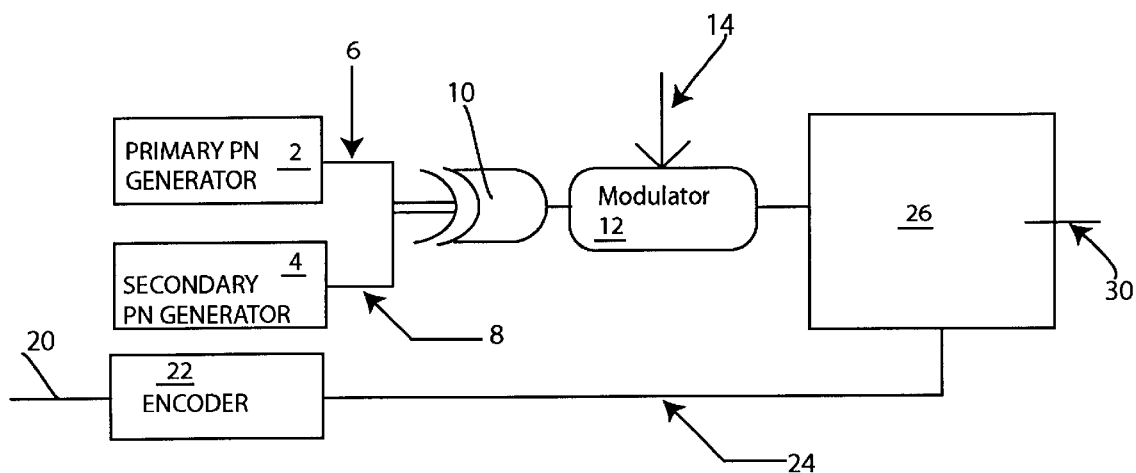
FIG. 1 is a block diagram of a first embodiment of a transmitter.

Referring to FIG. 1, there is shown a transmitter having a primary PN generator 2 and a secondary PN generator 4. The output 6 from the primary PN generator 2 and the output 8 from the secondary PN generator 4 are both fed to respective inputs of a XOR logic gate 10. The output from XOR gate 10 is fed to a modulator 12 which is BPSK modulated by an RF carrier provided at input 14. A data input 20 is fed to a Manchester encoder 22. An output 24 from Manchester encoder 22, is used to On-Off-Key (OOK) modulate the output from the BPSK modulator 12 in means 26 to produce a transmitted signal 30. The transmitted signal 30 is further filtered, amplified and supplied to an antenna as is normal practice (not shown).

The primary PN generator 2 has a 15 chip sequence and is clocked at 3 megachips/second. The pulse repetition rate of the primary PN sequence is 200 kHz. The minimum repetition rate should be greater than the bandwidth of the post despreading filter in the receiver and the frequency offset between the transmitter and receiver. The sequence length affects the jamming margin and search time with longer sequences increasing both the jamming margin and search time. The chip rate is determined by the sequence length-and the repetition rate for the sequence. The Primary PN generator 2 generates a maximal length linear shift register sequence.

Secondary PN generator 4 is clocked at 50 kilochips/second. The chip rate must be low enough to ensure that the signal passes through the post despreading filter in the receiver. It is found that the required result is achieved if secondary PN generator 4 has a clock rate less than half the repetition rate of primary PN generator 2.

BDSK modulator 12 generates a signal within the ISM band. The carrier is phase locked to the same reference oscillator used to provide the clocks for the PN generators and the data clock. Clearly all clocks will be subject to the same frequency-errors.

The data input to the Manchester encoder has a typical data rate of 1 kilobit/second. The data rate must be substantially less than the clock rate (in this embodiment 50 kilochips/second) of the secondary PN generator 4.

Figure 2:
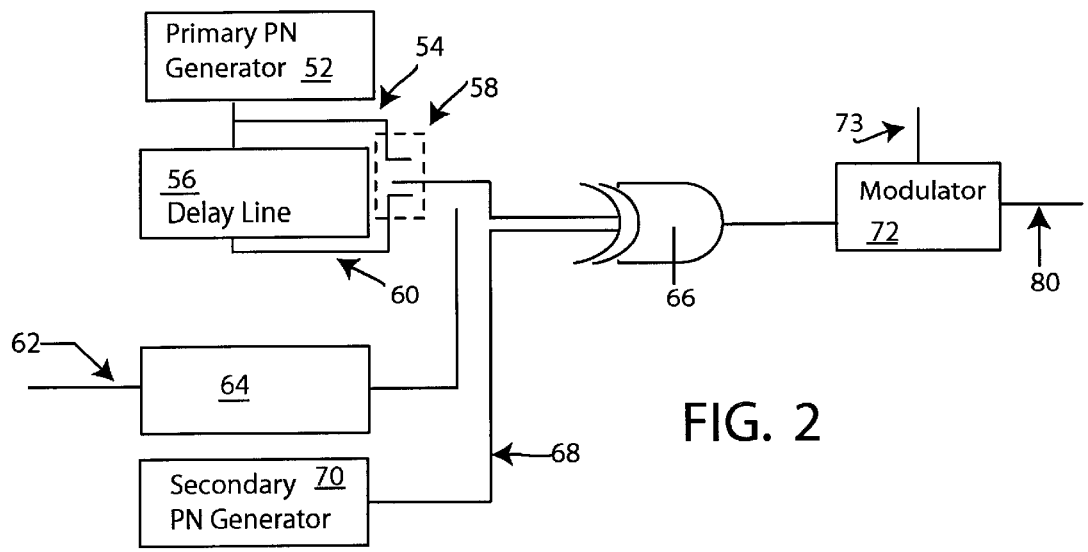
FIG. 2 is a block diagram of a second embodiment of a transmitter.

A second embodiment of a transmitter is illustrated in FIG. 2 and has a primary PN generator 52. The output 54 of the primary PN generator 52, called a prompt output, is supplied to a delay line 56 and one pole of a switch 58. The output from the delay line 56 is supplied to the second pole 60 of the switch 58. A data input 62 is supplied to a Manchester encoder 64. The output from Manchester encoder 64 is used to toggle the switch 58. The output from the switch 58 is fed to XOR gate 66 where it is gated with an output 68 from a secondary PN generator 70. The output from the XOR gate 66 is fed to a modulator 72 where it is used to BPSK modulate an RF carrier provided at input 73, and produce a transmitted signal 80 which is further processed in a conventional manner as before.

The second embodiment of the transmitter in FIG. 2 is similar to the first embodiment of a transmitter and subject to the same considerations described above. The main difference is that it does not require an OOK modulator and generates a nominally constant envelope output. It is not possible to demodulate the data using a simple AM detector.

The delay of delay line 56 is chosen to ensure that the delayed signal does not correlate with prompt signal 54. For a 15 chip sequence delay, between 1 and 14 chips will be suitable.

The second embodiment transmitter of FIG. 2 relies on the correlation properties of the maximal length sequences. Assuming the receiver is tracking the prompt sequence, the effect of outputting the delayed sequence in the transmitter is to reduce the output of the receiver correlator by greater than 20 dB compared to the prompt sequence. As far as the receiver is concerned, the signal has been subject to OOK modulation.

The receiver uses a single correlator non-coherent detector with a tau-dither tracking loop. The receiver acquires and tracks the primary sequence. The secondary sequence has a chip rate lower than the pulse repetition repeat rate of the primary sequence, and passes through the post-despreading filter of the receiver. The post detector filter is deliberately widened compared to the normal bandwidth required to filter the data. The addition of the secondary spreading sequence and widening of the post detector bandwidth improves the jamming margin of the system.

Figure 3:
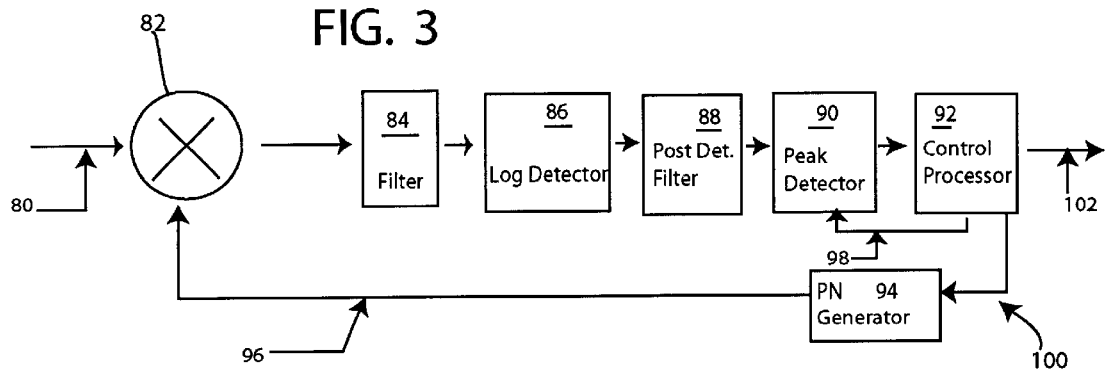
FIG. 3 is a block diagram of a receiver despreader and demodulator.

The receiver despreader and demodulator is shown in FIG. 3. A filtered IF signal 80 is input to a despreading mixer 82. The output from despreading mixer 82 is filtered by a post-despread filter 84. The output from the filter 84 is supplied to a log detector 86. The output from the log detector 86 is fed to a post detection filter 88, the output of which is fed to a peak detector 90. The output from the peak detector is fed to a control processor 92.

A PN generator 94 provides a second input 96 to the despreading mixer 82. The PN generator provides a local copy of the primary PN sequence of the transmitter.

The peak detector control input 98 is output from the control processor 92. This line resets peak detector 90 and enables the running of the peak detector.

The PN generator 94 is controlled by a second output 100 from the control processor 92. This controls the sliding of the PN generator during the search step and the dither during the tracking step.

Demodulated data 102 is output from a third output from the control processor 92.

The bandwidth of the post-despread filter 84 is determined by the frequency offset between the transmitter and receiver and by the repetition rate of the primary PN sequence. To function as part of the despreading correlator, the post despreading filter 84 must pass the despread carrier signal but reject sidebands of the spreading-signal. The system is designed to tolerate frequency shifts of greater than 50 kHz requiring a filter bandwidth of greater than 100 kHz.

Log detector 86 provides an output proportional to the logarithm of the magnitude of the Input signal. Typically a log detector has a dynamic range in excess of 70 dB. The use of the log detector avoids the use of an automatic gain control (AGC) loop. The log detector output is typically provided by a limiting amplifier and is sometimes called a received signal strength indicator (RSSI).

The post detection filter 88 filters the output from the log detector. Normally this filter would be matched to the bandwidth of the modulated data to maximize the tolerance to noise. Using 1 kilobit/second Manchester encoded data, a band pass filter with an upper limit of several kHz would be used. In this embodiment, the bandwidth is deliberately widened to greater than 20 kHz.

The control processor 92 operates in accordance with a stored program. It takes as input, the signal from peak detector 90 and outputs demodulated data as well as control signals to the peak detector 90 and PN generator 94.

Figure 4:
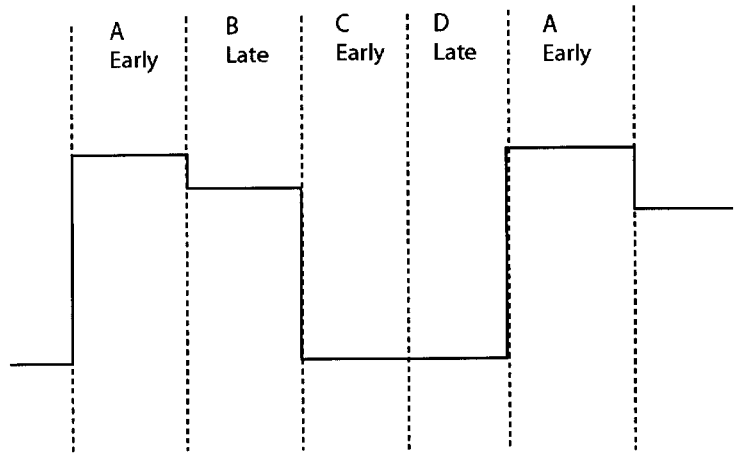
FIG. 4 is a representation of the log detector during the track step of operation of the receiver.

FIG. 4 shows the output from log detector 86 during the tracking step. Each data bit is split into 4 equal periods labelled A, B, C and D. During periods A and C, PN code generator 94 is dithered early. During periods B and D, the PN generator is dithered late.

The peak detector 90 is reset at the start of each data bit. The time of the peak during the data tit is measured. If the peak value occurs during periods A or C, then the tau-dither tracking loop is biased in the early direction or otherwise the tau-dither tracking loop is biased in the late direction.

The time of the peak is also used to determine whether a data '0' or a data '1' has been received. If the peak value occurs during periods A or B a data '0' is declared, but otherwise a data '1' is declared.

The jamming margin has been increased by the use of the secondary spreading sequence in the transmitter and widening the bandwidth of the post detection filter in the receiver described in FIG. 3.

Without the secondary spreading sequence, the output from the post-despreading filter 84 in FIG. 3. would be a single tone. Likewise, the result of interference from a single sine wave source would also be a single tone. The tone resulting from the despread received signal will beat with the tone resulting from the interference. Depending on the amplitude and phase of the sine wave interference, the two tones will destructively interfere and a lower output will be detected than when the despread tone is reduced in amplitude. The effect of the secondary spreading sequence is to randomise the phase of the despread signal.

The randomised phase of the despread signal is exploited by widening the bandwidth of the post detection filter 88 located between the log detector 86 and the peak detector 90. As the instantaneous phase constructively and destructively interferes with the tone from the interference, narrow peaks and large troughs are output from the log detector. The widened post-detector filter prevents the narrow peaks present at the output from the log detector from being attenuated before reaching the peak detector.

Accordingly, while a few embodiments of the present invention have been shown and described, it is to be understood that many changes and modifications may be made there unto without departing from the spirit and scope of the invention as defined in the appended claims.

What is claimed is:

1. A transmitter for extending the jamming margin of a DSSS communications system suitable for use in an AMR system, comprising:

a primary PN generator for producing a primary PN chip sequence;

a secondary PN generator with a clock rate less than half the repetition rate of the primary PN generator;

a logic gate for combining the outputs from said primary and secondary PN generators into an output signal;

a BPSK modulator coupled to send gate for receiving said output signal;

a data input terminal for receiving a digital signal representing information to be transmitted;

a Manchester encoder for receiving the data signal, the data rate being substantially less than the clock rate of the secondary PN generator and producing a data output; and means for modulating the primary PN sequence with the data output.

2. The transmitter as claimed in claim 1, wherein the modulating means comprises an OOK modulator with an input provided from the output of the BPSK modulator and controlled by the data output of the Manchester encoder.

3. The transmitter as claimed in claim 1, wherein the modulating means comprises a delay line fed from the primary PN generator, and a switch with a first input fed from the output from the primary PN generator, and a second input from the output from said delay line, the output of said switch being toggled between the inputs under the control of the data output of said Manchester encoder.

4. A receiver for use with a transmitter as claimed in claim 1, comprising:

a PN generator for producing a locally generated equivalent of the primary PN chip sequence;

means for correlating the received data with the locally generated equivalent of the primary PN chip sequence to produce a correlated output;

a log detector for receiving the correlated output and producing a log detector output;

a post detection filter coupled to said log detector having a bandwidth substantially wider than the data rate or receiving the log detector output and producing a post detection filter output;

a peak detector coupled to said past detection filter for receiving the post detection filter output and producing a peak detector output; and a control processor coupled to said peak detector for receiving the peak detector output and producing a data output and controlling the PN generator.

5. The receiver as claimed in claim 4, wherein the control processor controls the PN generator during a tracking and demodulation step of operation of the receiver in order to dither the PN sequence alternately early and late twice during each data bit period.

\* \* \* \* \*

UNITED STATES PATENT AND TRADEMARK OFFICE
CERTIFICATE OF CORRECTION

PATENT NO. : 6,442,191 B1
DATED : August 27, 2002
INVENTOR(S) : Strong

It is certified that error appears in the above-identified patent and that said Letters Patent is hereby corrected as shown below:

<u>Column 6,</u>
Line 1, after the word "to" please change the word "send" to -- said --.

Signed and Sealed this

Fifteenth Day of June, 2004

JON W. DUDAS
*Acting Director of the United States Patent and Trademark Office*